United States Patent
Hu et al.

(10) Patent No.: US 12,445,843 B2
(45) Date of Patent: Oct. 14, 2025

(54) METHOD FOR WIRELESS COMMUNICATION, WIRELESS PORT CONNECTION DEVICE, AND COMPUTER PROGRAM PRODUCT

(71) Applicant: Dell Products L.P., Round Rock, TX (US)

(72) Inventors: Chenxi Hu, Beijing (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 18/105,933

(22) Filed: Feb. 6, 2023

(65) Prior Publication Data
US 2024/0205673 A1    Jun. 20, 2024

(30) Foreign Application Priority Data
Dec. 15, 2022 (CN) .......................... 202211617764.6

(51) Int. Cl.
*H04M 1/66* (2006.01)
*H04W 12/041* (2021.01)
*H04W 12/0431* (2021.01)
*H04W 12/069* (2021.01)

(52) U.S. Cl.
CPC ....... *H04W 12/069* (2021.01); *H04W 12/041* (2021.01); *H04W 12/0431* (2021.01)

(58) Field of Classification Search
CPC . H04W 12/0431; H04W 12/06; H04W 12/03; H04W 12/069
See application file for complete search history.

(56) References Cited

U.S. PATENT DOCUMENTS

| 12,158,939 | B1 * | 12/2024 | Spears | H04L 9/3263 |
| 2023/0216947 | A1 * | 7/2023 | Bernardi | H04L 67/10 |
| | | | | 713/150 |

OTHER PUBLICATIONS

Wikipedia, "Serial Port," https://en.wikipedia.org/wiki/Serial_port, Dec. 1, 2022, 9 pages.
Wikipedia, "Zero Trust Security Model," https://en.wikipedia.org/wiki/Zero_trust_security_model, Jan. 22, 2023, 3 pages.

* cited by examiner

*Primary Examiner* — Shantell L Heiber
(74) *Attorney, Agent, or Firm* — Ryan, Mason & Lewis, LLP (57) ABSTRACT

Embodiments of the present disclosure relate to a method for wireless communication, a wireless port connection device, and a computer program product. The method in one embodiment is illustratively performed by a first wireless port device. The method includes: sending a first public key of the first wireless port device to an authentication server; receiving a signed first certificate from the authentication server, the first certificate comprising a server public key of the authentication server; receiving a signed second certificate from a second wireless port connection device; acquiring a second public key of the second wireless port connection device in the second certificate using the server public key; generating a symmetric key using the second public key; encrypting data using the symmetric key; and sending the encrypted data to the second wireless port connection device.

20 Claims, 7 Drawing Sheets

METHOD FOR WIRELESS COMMUNICATION, WIRELESS PORT CONNECTION DEVICE, AND COMPUTER PROGRAM PRODUCT

RELATED APPLICATION

The present application claims priority to Chinese Patent Application No. 202211617764.6, filed Dec. 15, 2022, and entitled "Method for Wireless Communication, Wireless Port Connection Device, and Computer Program Product," which is incorporated by reference herein in its entirety.

FIELD

Embodiments of the present disclosure relate to the field of computer processing and, more specifically, to a method for wireless communication, a wireless port connection device, and a computer program product.

BACKGROUND

With the development of computer technology, it is no longer possible to meet the demand of data transmission through physical interface devices (e.g., keyboards, mouses, network cards, display cards, and other input/output interfaces) of computing devices. Therefore, one computing device can communicate with another computing device through a variety of hardware ports. The hardware ports may include serial ports and parallel ports. A serial port refers to a port that transmits data sequentially bit by bit. Typically, a serial port may refer to a port that conforms to RS-232 or related standards such as RS-485 or RS-422. A parallel port refers to one that transmits data by means of parallel transmission. By employing various types of hardware ports, one computing device can communicate with another computing device.

SUMMARY

Embodiments of the present disclosure provide a method for wireless communication, a wireless port connection device, and a computer program product.

According to a first aspect of the present disclosure, a method for wireless communication is provided, the method being performed by a first wireless port device. The method includes: sending a first public key of the first wireless port device to an authentication server; receiving a signed first certificate from the authentication server, the first certificate comprising a server public key of the authentication server; receiving a signed second certificate from a second wireless port connection device; acquiring a second public key of the second wireless port connection device in the second certificate using the server public key; generating a symmetric key using the second public key; encrypting data using the symmetric key; and sending the encrypted data to the second wireless port connection device.

According to a second aspect of the present disclosure, a first wireless port connection device is provided for wireless communication with a second wireless port connection device. The first wireless port connection device includes at least one processor; and a memory coupled to the at least one processor and having instructions stored thereon, wherein the instructions, when executed by the at least one processor, cause the first wireless port connection device to perform actions comprising: sending a first public key of the first wireless port device to an authentication server; receiving a signed first certificate from the authentication server, the first certificate comprising a server public key of the authentication server; receiving a signed second certificate from a second wireless port connection device; acquiring a second public key of the second wireless port connection device in the second certificate using the server public key; generating a symmetric key using the second public key; encrypting data using the symmetric key; and sending the encrypted data to the second wireless port connection device.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Illustrative embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In computing devices, a serial port is a serial communication interface, and through a serial port, a message can be sequentially input or output one bit at a time. Throughout the development history of computers, data are always transmitted through serial ports to devices such as modems, terminals, and various peripheral devices, and directly transmitted between computers. Today, higher-speed standard ports (primarily Universal Serial Bus (USB) ports) have replaced serial ports. However, serial ports are still often used in applications (e.g., industrial automation systems, scientific instruments, point-of-sale (POS) systems, and some industrial and consumer products) that require simple and low-speed interfaces. For example, server computers may use serial ports as diagnostic consoles, while network hardware (e.g., routers and switches) often use serial console ports for configuration, diagnostics, and emergency maintenance access. To connect these devices to other devices, USB to serial port converters can quickly and easily add serial ports to modern computing devices.

Some conventional computing devices, networking devices, and embedded devices often require configurations, firmware upgrades, debugging, or monitoring through serial port connections. However, serial port connections are often not protected. For example, if the Baud rate on a serial port is known, any device can read the traffic. Furthermore, the data in the serial communication channel is plain text and is not protected by encryption algorithms. No authentication and authorization is introduced in serial port communications. If an intruder gains access at the correct Baud rate, data in the communication channel is at risk. In addition, the intruder may inject malicious commands and messages into the communication channel, which in turn will destroy the integrity of the data on the communication channel.

Furthermore, it is difficult to manage the security of devices that use serial port connections. In addition, there is no good solution for connecting serial ports remotely, which leads to inefficient and inconvenient connection of serial ports by engineers. Moreover, engineers have to go to the site and manually connect serial ports.

On the other hand, zero trust is a network security model based on the "zero trust" security concept that no device inside or outside a network of an organization should be granted access to a system or service before being authenticated and continuously verified. In the zero trust model, users and devices are not trusted until their identity authentication and authorization are verified. This model is typically suitable for private networks, as well as for users or devices outside the network. No matter whether a user or a device has accessed the network before, it is considered untrusted until it is authenticated.

The zero trust model relies on strong identity verification and authorization of each device and each user before any access or data transmission on the private network, regardless of whether the device or user is inside or outside the boundaries of that network. This process also incorporates analysis, filtering, and logging to verify behaviors and continuously monitors compromise signals. If a user or device shows behavior signs different from before, the zero trust model will record it as a possible threat and monitor it.

Thus, at least to address the above problems and other potential problems, embodiments of the present disclosure provide a method for wireless communication, which is performed by a first wireless port device. The method includes: sending a first public key of the first wireless port device to an authentication server; receiving a signed first certificate from the authentication server, the first certificate comprising a server public key of the authentication server; receiving a signed second certificate from a second wireless port connection device; acquiring a second public key of the second wireless port connection device in the second certificate using the server public key; generating a symmetric key using the second public key; encrypting data using the symmetric key; and sending the encrypted data to the second wireless port connection device. By configuring port connection devices as wireless port connection devices, this method can build a wireless communication link between hardware ports of the computing device, which can significantly save device costs, extend the distance of communication between the ports, and can make it very easy for engineers to operate and control. Further, with this wireless communication method, it is also possible to significantly improve the security of wireless communication links established between hardware ports, thereby effectively protecting the security and integrity of data transmission.

Figure 1:
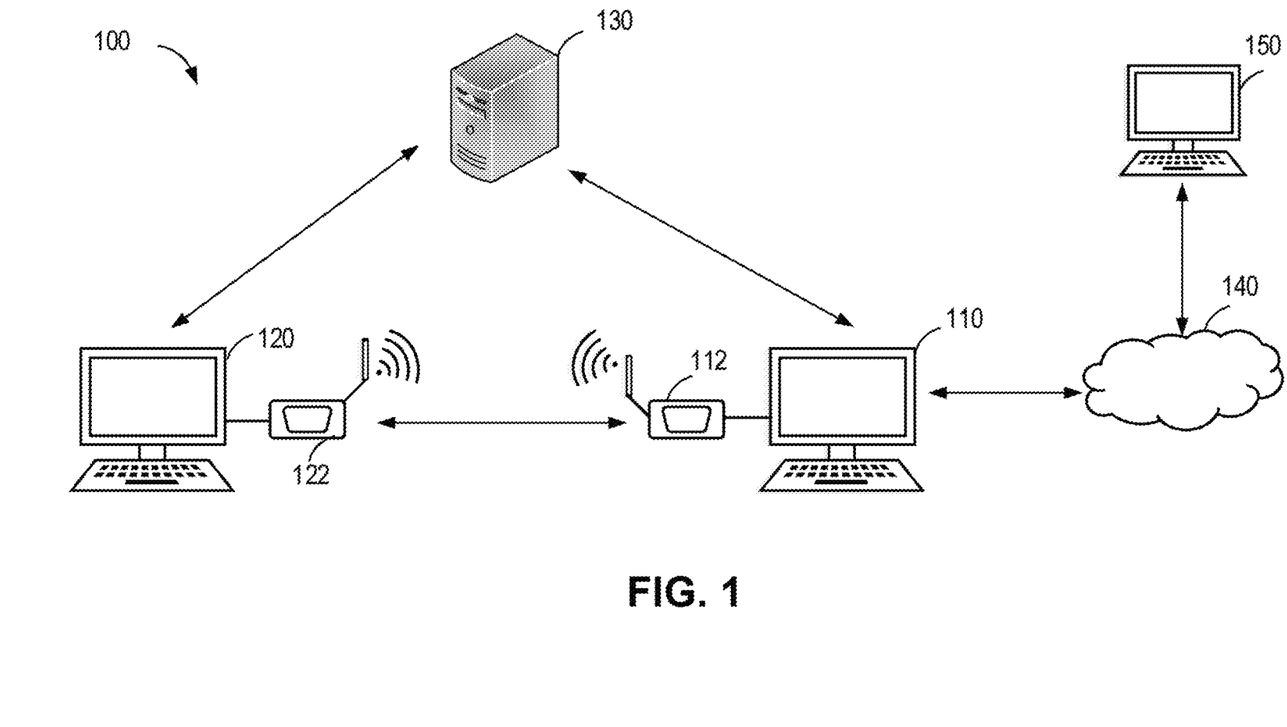
FIG. 1 illustrates a schematic diagram of an example environment in which embodiments of the present disclosure can be implemented.

Embodiments of the present disclosure will be further described in detail with reference to the accompanying drawings below. FIG. 1 is a schematic diagram of example environment 100 in which embodiments of the present disclosure can be implemented.

Example environment 100 includes computing device 110, computing device 120, and authentication server 130. Computing device 110 is provided with wireless port connection device 112, and computing device 120 is provided with wireless port connection device 122. It can be understood that the wireless port connection device may be provided in the computing device in various ways, for example, but not limited to, the wireless port connection device may be integrated in the computing device, the wireless port connection device may be removably attached to the computing device, and the like. In some implementations, for serial ports, the wireless port connection device may include a wireless serial port device. In some implementations, the wireless port connection device may be integrated with a wireless communication module that may use various types of wireless communication technologies as desired, for example, but not limited to, the 2.4 GHz wireless technology, the Bluetooth technology, and the like. Accordingly, a serial port device according to an embodiment of the present disclosure represents a connection device in which a wireless communication module is integrated in a serial port device.

In some implementations, authentication server 130 shown in FIG. 1 is configured for authenticating wireless port connection devices 112 and 122 included in computing device 110 and computing device 120, respectively, so that a wireless communication connection between computing device 110 and computing device 120 can be established via hardware port devices (e.g., wireless port connection devices 112 and 122).

FIG. 1 schematically illustrates a schematic diagram of the establishment of a wireless communication connection between computing device 110 and computing device 120 via a port (e.g., a serial port). In some implementations, wireless port connection device 112 may send a first public key of wireless port connection device 112 to authentication server 130 and receive a signed first certificate from authentication server 130, wherein the first certificate includes a server public key of authentication server 130. Wireless port connection device 112 receives a signed second certificate from wireless port connection device 122, and acquires a second public key of wireless port connection device 122 in the second certificate using the server public key. Wireless port connection device 112 generates a symmetric key using the second public key, encrypts data using this symmetric key, and sends the encrypted data to wireless port connection device 122.

Accordingly, wireless port connection device 122 may receive the signed first certificate from wireless port connection device 112, and acquire the first public key of wireless port connection device 112 in the first certificate using the server public key. Wireless port connection device 122 generates a symmetric key using the first public key and decrypts the received encrypted data using this symmetric key. Although the above illustration shows the case where data is sent from wireless port connection device 112 to wireless port connection device 122, it can be understood that data may also be sent from wireless port connection device 122 to wireless port connection device 112 and that the specific transmission process is similar to the transmission process described above. For the sake of brevity, this will not be repeated here.

In addition, as shown in FIG. 1, example environment 100 in FIG. 1 also includes network 140 and computing device 150. Computing device 150 may establish a remote connection with computing device 110 via network 140. Network 140 may include a wired network, a wireless network, or a combination of a wired network and a wireless network. Computing device 150 may control the communication settings between computing device 110 and computing device 120 via network 140. For example, computing device 150 may control, via network 140, the establishment of a wireless communication connection between computing device 110 and computing device 120, the termination of the wireless communication connection, and the Baud rate at which communication between computing device 110 and computing device 120 takes place, among other things.

In the method for wireless communication according to embodiments of the present disclosure, a port connection device is configured as a wireless port connection device integrated with a wireless communication module so that a wireless communication link can be built between hardware ports of the computing devices, which can significantly save device costs, extend the distance of communication between the ports, and can make it very easy for engineers to operate and control. Further, with this wireless communication method, it is also possible to significantly improve the security of wireless communication links established between hardware ports, thereby effectively protecting the security and integrity of data transmission.

A block diagram of example environment 100 in which embodiments of the present disclosure can be implemented has been described above with reference to FIG. 1. A flow chart of wireless communication method 200 according to an embodiment of the present disclosure is described below in conjunction with FIG. 2. Actions involved in method 200 are described below in conjunction with example environment 100 as shown in FIG. 1. For example, in some embodiments, method 200 may be performed by wireless port connection device 112 of computing device 110. It should be understood that method 200 may also include additional actions not shown and/or may omit actions shown, and the scope of the present disclosure is not limited in this regard.

Figure 2:
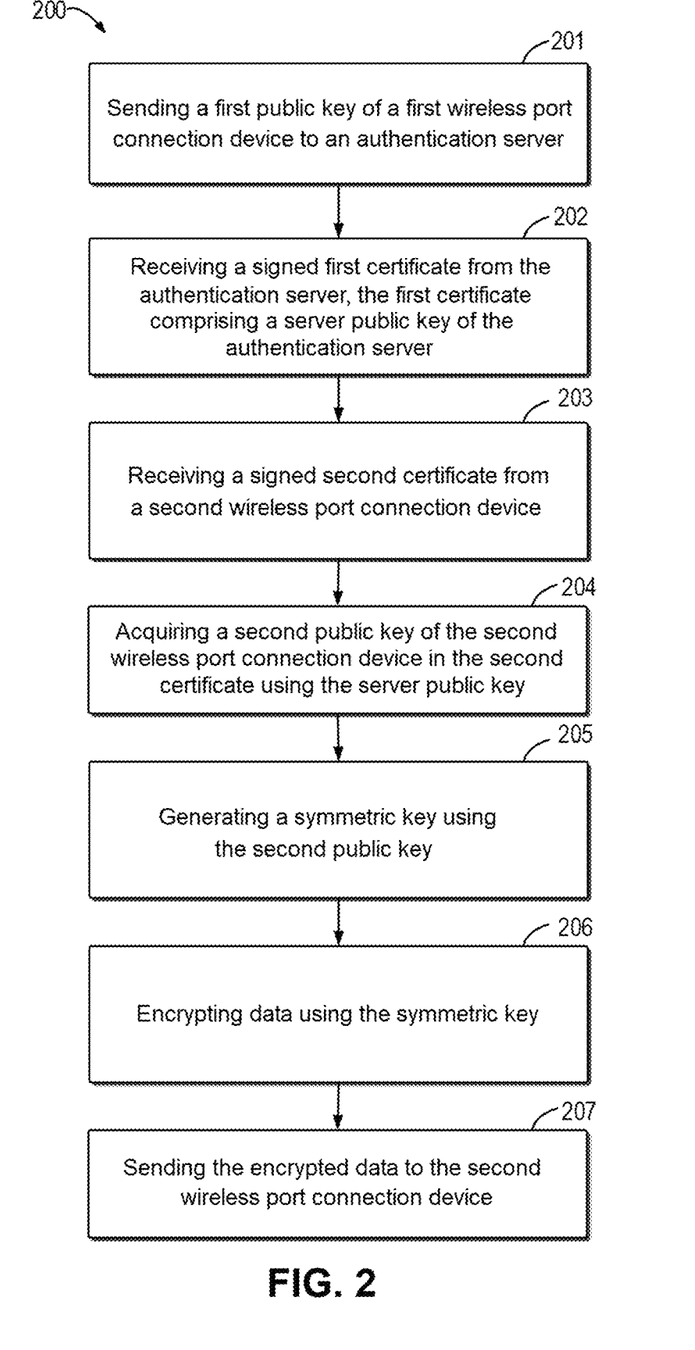
FIG. 2 depicts a flow chart of a wireless communication method according to an embodiment of the present disclosure.

At block 201, wireless port connection device 112 in computing device 110 sends a first public key of wireless port connection device 112 to authentication server 130. In some implementations, in order to establish a secure wireless communication link between computing device 110 and computing device 120, authentication and authorization is required for wireless port connection device 112 of computing device 110. To acquire authentication and authorization, wireless port connection device 112 sends its first public key to authentication server 130. Specifically, wireless port connection device 112 sends the public key K1 of wireless port connection device 112 to authentication server 130. In addition, in one embodiment, wireless port connection device 112 may also send the identifier (ID) of wireless port connection device 112 to authentication server 130. That is, wireless port connection device 112 may send the public key K1 and the identifier ID1 of wireless port connection device 112 to authentication server 130.

Furthermore, similarly, in order to establish a secure wireless communication link with computing device 110, wireless port connection device 122 of computing device 120 also needs to be authenticated and authorized by authentication server 130. The specific authentication and authorization process for wireless port connection device 122 will be described below in conjunction with FIG. 3.

At block 202, wireless port connection device 112 may receive a signed first certificate CTF1 from authentication server 130. After receiving the first public key K1 (and in some embodiments, the identifier ID1 may also be received) from wireless port connection device 112, authentication server 130 may verify the legitimacy of wireless port connection device 112. After verifying the legitimacy of wireless port connection device 112, authentication server 130 may create a first certificate and sign the first certificate. Authentication server 130 sends the signed first certificate CTF1 to wireless port connection device 112. The signed first certificate CTF1 is used for wireless port connection device 112 and includes a server public key of authentication server 130. Upon receiving the signed first certificate CTF1, wireless port connection device 112 obtains authentication and authorization from authentication server 130 so that it can establish a connection with wireless port connection device 122 of computing device 120 in subsequent steps.

At block 203, wireless port connection device 112 receives a signed second certificate CTF2 from wireless port connection device 122. In some implementations, the second certificate CTF2 is sent from authentication server 130 to wireless port connection device 122 based on verification of the legitimacy of wireless port connection device 122 by authentication server 130, and this authentication process will be described specifically below.

In some embodiments, to establish a secure wireless connection between computing device 110 and computing device 120, wireless port connection device 112 of computing device 110 may receive the signed second certificate CTF2 from wireless port connection device 122, and wireless port connection device 122 of computing device 120 may also receive the signed first certificate CTF1 from wireless port connection device 112. In other words, to establish a secure wireless connection between computing device 110 and computing device 120, wireless port connection device 112 and wireless port connection device 122 exchange their respective certificates CTF1 and CTF2 for confirming the legitimacy of the peer wireless port connection devices in subsequent steps.

At block 204, wireless port connection device 112 acquires a second public key in the second certificate using the server public key. Specifically, after wireless port connection device 112 receives the second certificate CTF2, wireless port connection device 112 verifies the second certificate CTF2 by decrypting the second certificate CTF2 using the server public key of the authentication server and obtains the public key K2 of wireless port connection device 122 in the second certificate CTF2.

Similarly, wireless port connection device 122 may also verify the first certificate CTF1 by decrypting the first certificate CTF1 using the server public key of the authentication server and obtain the public key K1 of wireless port connection device 122 in the first certificate CTF1. The specific process will be described below in conjunction with FIG. 3.

At block 205, wireless port connection device 112 generates a symmetric key Ks using the second public key K2. The symmetric key Ks is used by wireless port connection device 112 to encrypt data to achieve secure transmission of the data. The specific process of generating the symmetric key Ks will be described below in conjunction with the accompanying drawings.

At block 206, wireless port connection device 112 encrypts the data using the symmetric key Ks and, at block 207, sends the encrypted data to wireless port connection device 122.

Figure 3:
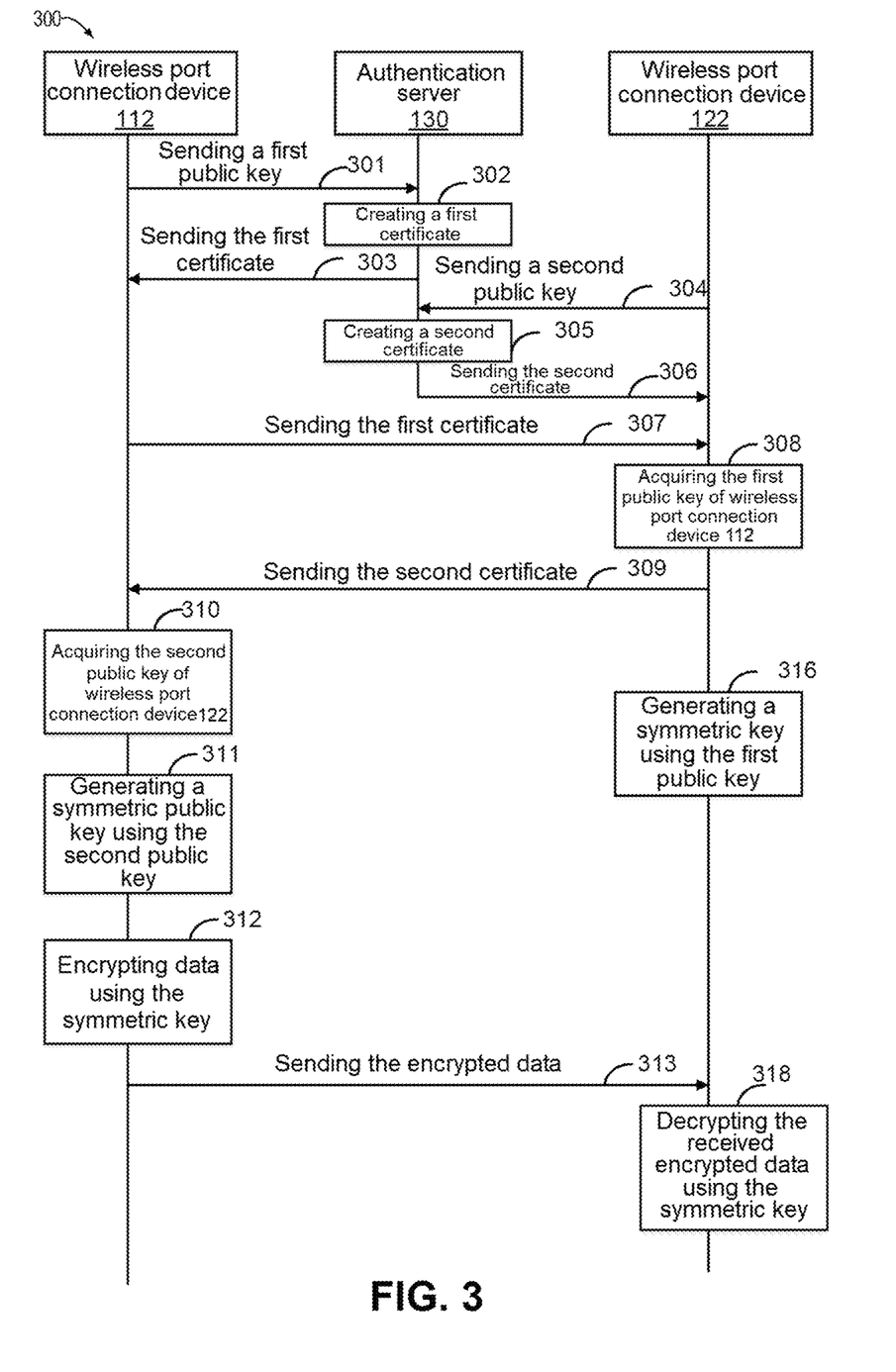
FIG. 3 schematically illustrates a signaling diagram for a wireless communication method according to an embodiment of the present disclosure.

FIG. 3 is signaling diagram 300 of a wireless communication method according to an embodiment of the present disclosure. This embodiment illustratively includes steps denoted 301 through 318 as shown. The order of the steps in FIG. 3 is not strictly defined, and it can be understood by a person skilled in the art that some of the steps in FIG. 3 can be skipped, reordered, changed in order, and so on.

At 301, in order to establish a secure wireless communication link between computing device 110 and computing device 120, wireless port connection device 112 of computing device 110 needs to be authenticated and authorized by authentication server 130. To acquire the authentication and authorization, wireless port connection device 112 sends a first public key of wireless port connection device 112 to authentication server 130. In addition, in one embodiment, wireless port connection device 112 may also send the identifier (ID) of wireless port connection device 112 to authentication server 130 at 301. That is, wireless port connection device 112 may send the first public key K1 and the identifier ID1 of wireless port connection device 112 to authentication server 130 at 301.

Authentication server 130 may receive the first public key K1 from wireless port connection device 112 and verify the legitimacy of wireless port connection device 112. After verifying the legitimacy of wireless port connection device 112, authentication server 130 may create a first certificate at 302 and sign the first certificate.

Authentication server 130 sends the signed first certificate CTF1 to wireless port connection device 112 at 303. The signed certificate CTF1 includes the server public key of authentication server 130. Upon receiving the signed first certificate CTF1, wireless port connection device 112 obtains authentication and authorization from authentication server 130 so that it can establish a connection with wireless port connection device 122 of computing device 120 in subsequent steps.

Similarly, in order to establish a secure wireless communication link with computing device 110, wireless port connection device 122 of computing device 120 also needs to be authenticated and authorized by authentication server 130. Accordingly, at 304, wireless port connection device 122 sends the second public key K2 of wireless port connection device 122 to authentication server 130. In addition, in one embodiment, wireless port connection device 122 may also send the identifier of wireless port connection device 122 to authentication server 130 at 304. That is, wireless port connection device 122 may send the second public key K2 and the identifier ID2 of wireless port connection device 122 to authentication server 130 at 304.

Authentication server 130 may receive the second public key K2 from wireless port connection device 122 and verify the legitimacy of wireless port connection device 122. After verifying the legitimacy of wireless port connection device 122, authentication server 130 may create a second certificate at 305 and sign the second certificate.

Authentication server 130 sends the signed second certificate CTF2 to wireless port connection device 122 at 306. The signed certificate CTF2 includes the server public key of authentication server 130. Upon receiving the signed second certificate CTF2, wireless port connection device 122 obtains authentication and authorization from authentication server 130 so that it can establish a connection with wireless port connection device 112 of computing device 110 in subsequent steps.

It can be understood that the order in which the corresponding wireless port connection devices send the corresponding public keys to the authentication server as illustrated in FIG. 3 may not necessarily be the order in FIG. 3. In other words, wireless port connection device 112 may send the corresponding public key to authentication server 130 earlier than, later than, or simultaneously with wireless port connection device 122. This is not limited by the present disclosure.

At 307, wireless port connection device 112 may send the first certificate CTF1 received from authentication server 130 to wireless port connection device 122. After wireless port connection device 122 receives the first certificate CTF1, wireless port connection device 122 verifies the first certificate CTF1 by decrypting the first certificate CTF1 using the server public key of authentication server 130, and obtains the first public key K1 of wireless port connection device 112 in the first certificate CTF1 at 308.

Similarly, at 309, wireless port connection device 122 may send the second certificate CTF2 received from authentication server 130 to wireless port connection device 112. After wireless port connection device 112 receives the second certificate CTF2, wireless port connection device 112 verifies the second certificate CTF2 by decrypting the second certificate CTF2 using the server public key of authentication server 130 at 310, and obtains the second public key K2 of wireless port connection device 122 in the second certificate CTF2.

Thus, in order to establish a secure wireless connection between computing device 110 and computing device 120, wireless port connection device 112 and wireless port connection device 122 exchange their respective certificates CTF1 and CTF2 for confirming the legitimacy of the peer wireless port connection devices, thereby establishing a secure communication link. In addition, it can be understood that embodiments of the present disclosure do not limit the order in which wireless port connection device 112 sends the first certificate CTF1 to wireless port connection device 122 and wireless port connection device 122 sends the second certificate CTF2 to wireless port connection device 112.

After acquiring the second public key of wireless port connection device 122, wireless port connection device 112 may also generate a symmetric key Ks using the second public key K2 at 311. The specific process of generating the symmetric key Ks will be described in detail below.

At 312, the wireless port connection device encrypts data using the symmetric key Ks and sends the encrypted data to wireless port connection device 122 at 313, thereby communicating with wireless port connection device 122.

In some implementations, wireless port connection device 122 generates at 316 the symmetric key using the first public key acquired at 308. Moreover, wireless port connection device 122 decrypts the received encrypted data using the symmetric key at 318. The specific implementation of generating the symmetric key will be described in detail below in conjunction with the accompanying drawings.

In the method for wireless communication according to embodiments of the present disclosure, a port connection device is configured as a wireless port connection device integrated with a wireless communication module so that a wireless communication link can be built between hardware ports of the computing device, which can significantly save device costs, extend the distance of communication between the ports, and can make it very easy for engineers to operate and control. Further, with this wireless communication method, it is also possible to significantly improve the security of wireless communication links established between hardware ports, thereby effectively protecting the security and integrity of data transmission.

Figure 4:
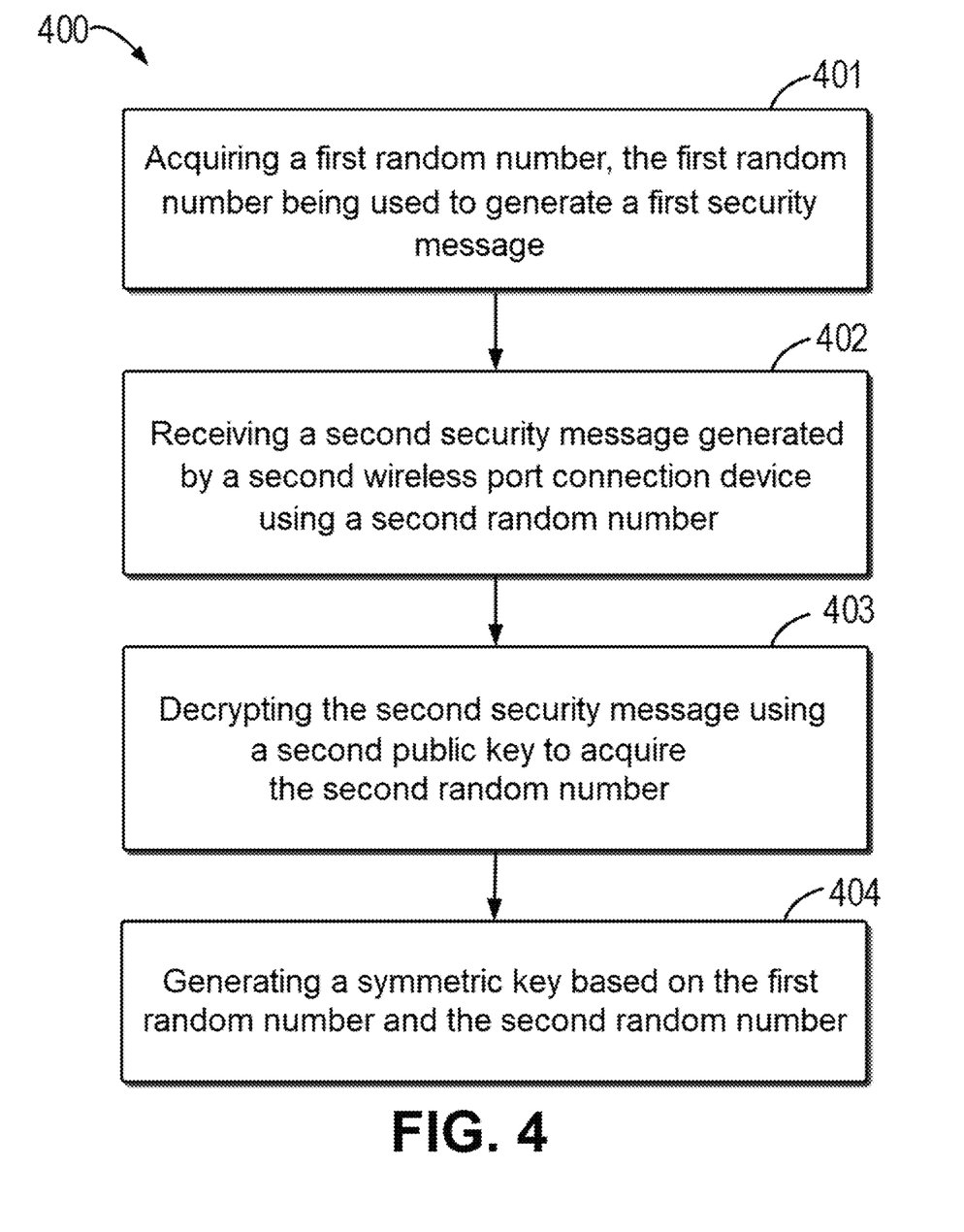
FIG. 4 schematically illustrates a flow chart of a method for generating a symmetric key using a second public key according to an embodiment of the present disclosure.

FIG. 4 schematically illustrates flow chart of a method 400 for generating a symmetric key using a second public key according to an embodiment of the present disclosure. It should be understood that method 400 may also include additional actions not shown and/or may omit actions shown, and the scope of the present disclosure is not limited in this regard.

At block 401, wireless port connection device 112 acquires a first random number R1, this first random number R1 being used to generate a first security message $MES_{secure1}$. At block 402, wireless port connection device 112 receives a second security message $MES_{secure2}$ generated by the second wireless port connection device (i.e., wireless port connection device 122) using a second random number R2. In some implementations, wireless port connection device 112 may acquire any first random number R1 by any method, wireless port connection device 122 may acquire any second random number R2 by any method, and the first random number R1 and the second random number R2 may or may not be equal, which is not limited in the present disclosure. Further, in some implementations, the second wireless port connection device (i.e., wireless port connection device 122) may encrypt the second random number R2 using a second private key of wireless port connection device 122, thereby generating the second security message $MES_{secure2}$. Wireless port connection device 112 may receive the second security message $MES_{secure2}$ generated by the second wireless port connection device (i.e., wireless port connection device 122) using the second random number R2.

At block 403, wireless port connection device 112 decrypts the second security message $MES_{secure2}$ using the acquired second public key K2 (i.e., the public key of wireless port connection device 122) to acquire the second random number R2.

At block 404, wireless port connection device 112 may generate the symmetric key Ks based on the first random number and the second random number. In some implementations, wireless port connection device 112 may use any known or future developed technique to generate the symmetric key Ks based on the first random number and the second random number, which is not limited in the present disclosure.

At the same time as, before, or after wireless port connection device 112 acquires the second random number R2 from wireless port connection device 122, wireless port connection device 122 may also acquire the first random number R1 from wireless port connection device 112. Subsequently, wireless port connection device 122 may generate the symmetric key Ks based on the first random number R1 and the second random number R2, in a similar way to what wireless port connection device 112 does. As a result, both wireless port connection device 112 and wireless port connection device 122 may have the symmetric key Ks for use in subsequent encryption and decryption processes.

Figure 5:
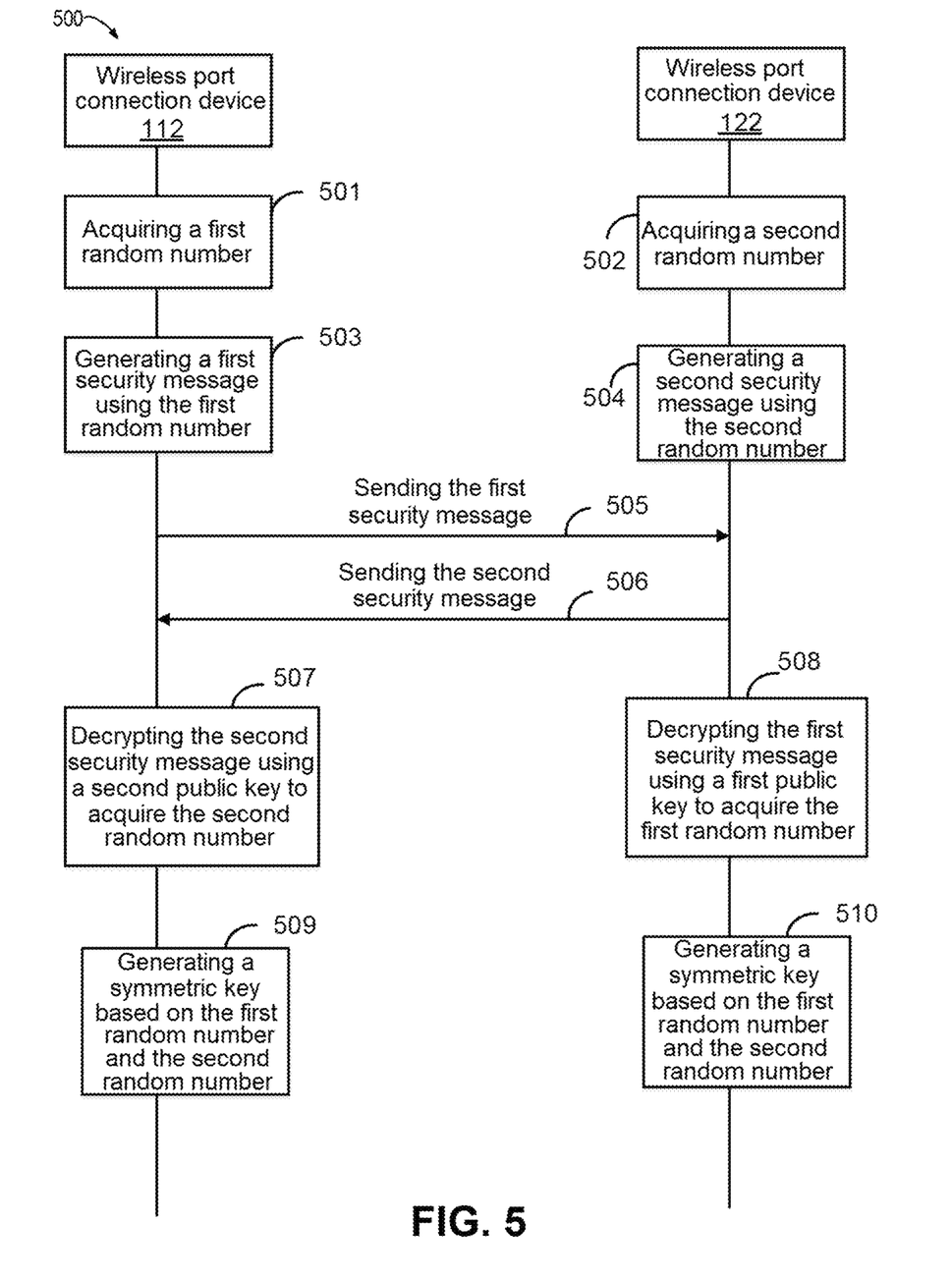
FIG. 5 schematically illustrates a signaling process for generating symmetric keys by a first wireless port connection device and a second wireless port connection device according to an embodiment of the present disclosure.

Signaling process 500 for generating symmetric keys by wireless port connection device 112 and wireless port connection device 122 according to an embodiment of the present disclosure will be illustrated below in conjunction with FIG. 5. This embodiment illustratively includes steps denoted 501 through 510 as shown. The order of the steps in FIG. 5 is not strictly defined, and it can be understood by a person skilled in the art that some of the steps in FIG. 5 can be skipped, reordered, changed in order, and so on.

At 501, wireless port connection device 112 acquires a first random number R1. As described above, wireless port connection device 112 may acquire any first random number R1 by any method, and that first random number R1 is used to generate a first security message $MES_{secure1}$.

At 502, wireless port connection device 122 acquires a second random number R2. As described above, wireless port connection device 122 may acquire any second random number R2 by any method, and that second random number R2 is used to generate a second security message $MES_{secure2}$. The first random number R1 and the second random number R2 may or may not be equal, which is not limited in the present disclosure.

At 503, wireless port connection device 112 generates the first security message $MES_{secure1}$ using the first random number R1. In some implementations, wireless port connection device 112 may encrypt the first random number R1 using the first private key of wireless port connection device 112 to generate the first security message $MES_{secure1}$.

At 504, wireless port connection device 122 generates the second security message $MES_{secure2}$ using the second random number R2. In some implementations, wireless port connection device 122 may encrypt the second random number R2 using a second private key of wireless port connection device 122 to generate the second security message $MES_{secure2}$.

It can be understood that the order of steps performed by each wireless port connection device illustrated in FIG. 5 is only an example. It can be understood by a person skilled in the art that the order in which the wireless port connection devices acquire their respective random numbers and generate the security messages using the respective random numbers can be adjusted or changed depending on needs and actual situations. For example, steps 502 and 504 may occur simultaneously with steps 501 and 503, may occur before steps 501 and 503, or may occur after steps 501 and 503. In some embodiments, steps 502 and 504 may also occur after step 505, and so on. The present disclosure does not strictly limit the time of occurrence of each step.

At 505, wireless port connection device 112 may send the first security message $MES_{secure1}$ to wireless port connection device 122. At 506, wireless port connection device 122 may send the second security message MES$_{secure2}$ to wireless port connection device 112. It can be understood that the order in which a wireless port connection device sends the security message to a peer wireless port connection device may differ from the order illustrated in FIG. 5, and the order in which the security messages are sent may be adjusted depending on needs and actual situations.

At 507, wireless port connection device 112 may decrypt the second security message MES$_{secure2}$ using the second public key to acquire the second random number R2. Similarly, at 508, wireless port connection device 122 may decrypt the first security message MES$_{secure1}$ using the first public key to acquire the first random number R1.

At 509, wireless port connection device 112 may generate a symmetric key based on the first random number R1 and the second random number R2. Similarly, at 510, wireless port connection device 122 may generate a symmetric key based on the first random number R1 and the second random number R2. Thus, by the method described above, wireless port connection devices 112 and 122 may generate symmetric keys for use in secure communication.

As described above, the wireless communication method according to an embodiment of the present disclosure may further determine the integrity of the transmitted data. In some implementations, wireless port connection device 112 may acquire a first hash value by performing a hash operation on the data to be transmitted. For example, the first hash value may be acquired by performing a hash operation on the data to be transmitted through the following equation:

$$\text{Hash 1} = \text{Hash\_function (message)} \quad \text{(Equation 1)}$$

where Hash1 denotes the first hash value acquired after the hash operation; and Hash_function( ) denotes the function applied to the data to be transmitted, and message denotes the data to be transmitted, which may include data in various formats, and the present disclosure does not limit this.

Wireless port connection device 112 may further encrypt the data to be transmitted and the first hash value using the symmetric key to acquire the encrypted transmission message. In some implementations, the first hash value Hash1 is used to determine the integrity of the transmitted data during wireless communication.

In some implementations, wireless port connection device 122 may receive the encrypted transmission message and, upon receiving the encrypted transmission message, decrypt the encrypted transmission message. For example, wireless port connection device 122 may decrypt the encrypted message using the symmetric key. Through the decryption operation, wireless port connection device 122 may obtain a hash value to be compared and the decrypted data.

Further, wireless port connection device 122 may perform a hash operation on the data acquired after decryption and acquire the second hash value Hash2. Wireless port connection device 122 may perform a hash operation on the decrypted data in a manner similar to that of Equation 1 to obtain the second hash value Hash2. Afterwards, wireless port connection device 122 may compare the hash value to be compared that was acquired after decryption with the second hash value and determine whether the data is integral during communication according to the result of the comparison, where the term "integral" as used in this context herein refers to data integrity being preserved during communication, or in other words, that the data is not corrupted during transmission. For example, when the hash value to be compared is equal to the second hash value, wireless port connection device 122 determines that the data is integral during transmission, in other words, the received data is consistent with the data to be transmitted. When the hash value to be compared is not equal to the second hash value, wireless port connection device 122 determines that the received data is not integral, for example, that the data was corrupted during transmission. Then, wireless port connection device 122 can accordingly take processing measures on the received data, such as operations of discarding data or restoring data, which will not be repeated here.

It can be understood that when the hash value to be compared is equal to the second hash value, it means that the data is not corrupted during transmission and is integral. Therefore, the hash value to be compared, the second hash value Hash2, and the first hash value Hash1 are all equal.

When transmitting data, the first wireless port connection device performs a hash operation on the data to be transmitted; and when receiving the data, the second wireless port connection device performs a hash operation on the received data. By comparing the hash values, it is possible to determine whether the data is integral during transmission. Thus, the integrity of data transmission can be efficiently determined, and the privacy and security of the data during transmission can be ensured.

It can be understood that while the above process is illustrated taking an example where data is sent from wireless port connection device 112 to wireless port connection device 122, in practice, the determination of the integrity of data transmission when the data is sent from wireless port connection device 122 to wireless port connection device 112 may have similar operations, which, for the sake of brevity, will not be described here.

In some implementations, the symmetric key may have an expiration date, and this expiration date is negotiable between wireless port connection device 112 and wireless port connection device 112 so that a suitable expiration date can be determined based on the state of wireless communication between the devices and specific needs, which in turn can better ensure the security of data transmission and communication.

In some implementations, wireless port connection device 112 may include a first negotiation message in the encrypted transmission message. That is, wireless port connection device 112 may encrypt the data to be transmitted, the first hash value, and the first negotiation message to obtain the encrypted message, and send the encrypted message to wireless port connection device 122. In some implementations, wireless port connection device 112 may initially send the expiration date of the default symmetric key to wireless port connection device 122. As the negotiation, wireless port connection device 122 may send a second negotiation message to wireless port connection device 112, and the second negotiation message includes an expiration date (e.g., a "second expiration date") set by wireless port connection device 122 for the symmetric key. After receiving the second negotiation message from wireless port connection device 122, wireless port connection device 112 may use the second expiration date in the second negotiation message to update the expiration date of the symmetric key. For example, wireless port connection device 112 may update the expiration date of the symmetric key to the second expiration date. Thus, the setting of the expiration date of this key can be achieved.

It can be understood that if wireless port connection device 112 determines that the received second expiration date cannot meet the communication requirements, it may also be possible to set the expiration date of the symmetric key meeting the requirements by further sending a negotiation message to wireless port connection device 122. Such is done until the expiration date of the symmetric key that is confirmed by both wireless port connection device 112 and wireless port connection device 122 as meeting the communication requirements is set.

By determining the expiration date of the symmetric key by means of the negotiation approach described above, it is possible to continue to generate an updated symmetric key in the manner of generating the symmetric key as described above after the expiration of the expiration date of the symmetric key, thereby further ensuring the security of message communication during wireless communication and improving the quality of communication.

Figure 6:
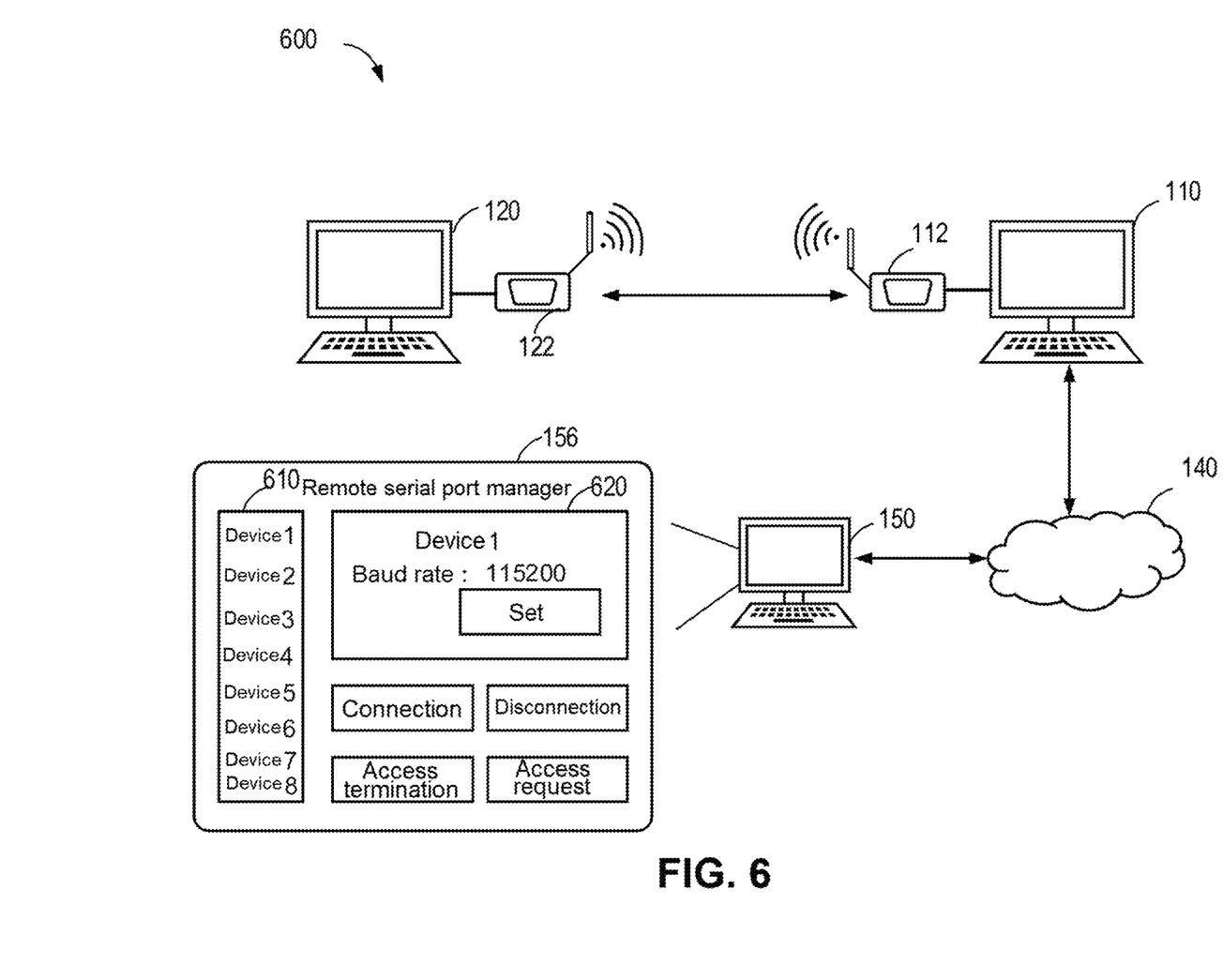
FIG. 6 schematically illustrates a schematic diagram of control of wireless port connection by a remote computing device according to an embodiment of the present disclosure.

In some implementations, the wireless communication between wireless port connection device 112 and wireless port connection device 122 can be controlled by computing device 150, which is illustratively a remote computing device. FIG. 6 schematically illustrates schematic diagram 600 of control of wireless port connection by a remote computing device according to an embodiment of the present disclosure. In FIG. 6, computing device 150 is connected to computing device 110 via network 140 and remotely controls wireless communication between wireless port connection device 112 and wireless port connection device 122 via network 140.

In some implementations, computing device 150 may control the wireless communication between wireless port connection device 112 and wireless port connection device 122 via a remote serial port manager 156. A schematic diagram of control by computing device 150 via remote serial port manager 156 is shown in FIG. 6. Remote serial port manager 156 may be presented as a graphical user interface on the screen of computing device 150, and the interface may include control 610 for selecting a device, for example, for selecting a device that requires wireless communication, such as device 1, device 2, device N, and the like. Remote serial port manager 156 may also have device setting control 620, wherein an engineer can set parameters such as the Baud rate of a corresponding device in the interface, as shown in FIG. 6. In addition, remote serial port manager 156 may also include other controls, for example, a connection control, a disconnection control, an access termination control, an access request control, etc., for control of connections and access between devices.

It can be understood that while remote serial port manager 156 is illustrated in FIG. 6, it can be understood that computing device 150 may include other types of port managers for controlling port connections between devices. Furthermore, the interface of the port manager may have any other suitable interface and is not limited to the interface form illustrated in FIG. 6. In addition, although the serial port manager is illustrated in FIG. 6 as an example, it can be understood that the wireless port connection device according to embodiments of the present disclosure may also be used for wireless communication of other types of ports, such as parallel port communication, and accordingly, the port manager in computing device 150 may also include a port manager for corresponding types of ports.

Thus, wireless communication of ports between a plurality of computing devices can be achieved through the remote computing device. Advantageously, engineers can safely and conveniently achieve remote connection and secure data communication through the remote computing device.

In the method for wireless communication according to embodiments of the present disclosure, a port connection device is configured as a wireless port connection device integrated with a wireless communication module so that a wireless communication link can be built between hardware ports of the computing device, which can significantly save device costs, extend the distance of communication between the ports, and can make it very easy for engineers to operate and control. Further, with this wireless communication method, it is also possible to significantly improve the security of wireless communication links established between hardware ports, thereby effectively protecting the security and integrity of data transmission.

Figure 7:
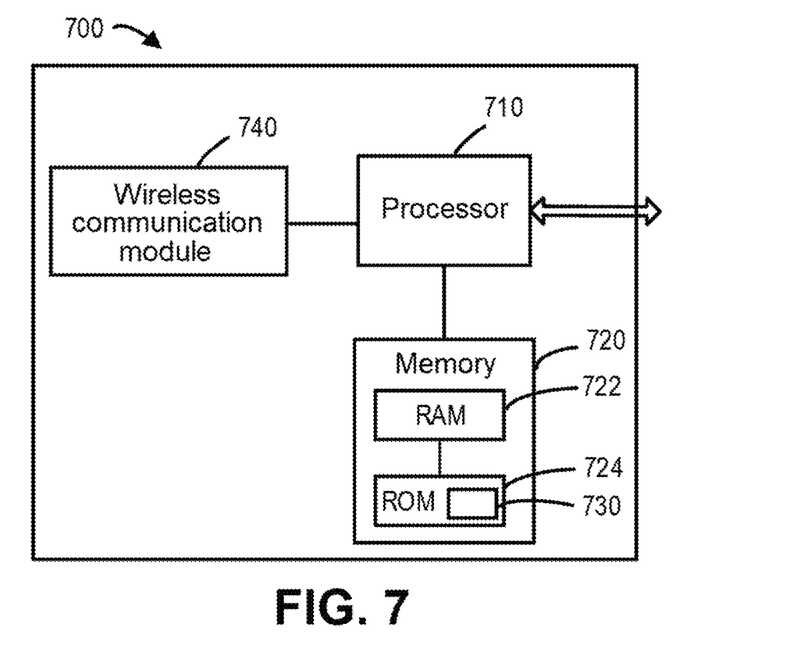
FIG. 7 schematically illustrates a simplified block diagram of a device suitable for implementing example embodiments of the present disclosure.

FIG. 7 schematically illustrates a simplified block diagram of device 700 suitable for implementing example embodiments of the present disclosure. Device 700 may be provided to implement a communication device, for example, wireless port connection device 112 or wireless port connection device 122 as shown in FIG. 1. As shown, device 700 includes one or more processors 710, one or more memories 720 coupled to processors 710, and one or more wireless communication modules 740 coupled to processors 710.

Wireless communication module 740 is used for two-way communication. Wireless communication module 740 has one or more communication interfaces to facilitate communication with one or more other modules or devices. The communication interfaces may represent any interface necessary to communicate with other network elements. In some example embodiments, wireless communication modules 740 may include at least one antenna.

Processor 710 may be of any type suitable for a local technology network and may include, as a non-limiting example, one or more of the following: a general-purpose processor, a special-purpose processor, a microprocessor, a digital signal processor (DSP), and a processor based on a multi-core processor architecture. Device 700 may have multiple processors, such as dedicated integrated circuit chips, that are temporally subordinate to a clock synchronized with the main processor.

Memory 720 may include one or more non-volatile memories and one or more volatile memories. Examples of a non-volatile memory include, but are not limited to, a read-only memory (ROM) 724, an electrically programmable read-only memory (EPROM), a flash memory, a hard drive, a compact disk (CD), a digital video disk (DVD), an optical disk, a laser disk, and other magnetic storage and/or optical storage. Examples of a volatile memory include, but are not limited to, a random access memory (RAM) 722 and other volatile memory that will not persist during a power failure.

The various processes and processing described above, such as methods 200 and 400, may be performed by processor 710. For example, in some embodiments, methods 200 and 400 may be implemented as computer software program 730 that is tangibly included in a machine-readable medium, such as memory 720. In some embodiments, part of or all of the computer program may be loaded and/or installed onto device 700 via ROM 724 and/or wireless communication module 740. When the computer program is loaded into memory 720 and executed by processor 710, one or more actions of methods 200 and 400 described above can be implemented.

Embodiments of the present disclosure include a method, an apparatus, a system, and/or a computer program product.

The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an EPROM, a flash memory, a static random access memory (SRAM), a portable compact disc read-only memory (CD-ROM), a DVD, a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status message of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technological improvements, so as to enable persons of ordinary skill in the art to understand the embodiments disclosed herein.

What is claimed is:

1. A method for wireless communication, which is performed by a first wireless port connection device, the method comprising:
   sending a first public key of the first wireless port connection device to an authentication server;
   receiving a signed first certificate from the authentication server, the first certificate comprising a server public key of the authentication server;
   receiving a signed second certificate from a second wireless port connection device;
   acquiring a second public key of the second wireless port connection device in the second certificate using the server public key;
   generating a symmetric key using the second public key;
   encrypting data using the symmetric key; and
   sending the encrypted data to the second wireless port connection device.

2. The method according to claim 1, further comprising:
   sending the first certificate to the second wireless port connection device for use in receiving the second certificate.

3. The method according to claim 1, wherein acquiring a second public key of the second wireless port connection device in the second certificate using the server public key comprises:
   decrypting the second certificate using the server public key to acquire the second public key in the second certificate.

4. The method according to claim 1, wherein generating a symmetric key using the second public key comprises:
   acquiring a first random number, the first random number being used to generate a first security message;
   receiving a second security message generated by the second wireless port connection device using a second random number;
   decrypting the second security message using the second public key to acquire the second random number; and
   generating the symmetric key based on the first random number and the second random number.

5. The method according to claim 4, wherein generating a first security message comprises:
   generating the first security message by encrypting the first random number using a first private key of the first wireless port connection device.

6. The method according to claim 1, wherein encrypting data using the symmetric key comprises:
   acquiring a first hash value by performing a hash operation on the data; and
   acquiring an encrypted transmission message by encrypting the data and the first hash value using the symmetric key, wherein the first hash value is used to determine the integrity of the data during wireless communication.

7. The method according to claim 6, wherein the encrypted transmission message is received by the second wireless port connection device and is decrypted by the second wireless port connection device using the symmetric key to acquire a decrypted message, wherein the decrypted message comprises a hash value to be compared.

8. The method according to claim 7, wherein the decrypted message is used by the second wireless port connection device to acquire a second hash value, and a comparison of the second hash value with the hash value to be compared is used to determine the integrity of the data during wireless communication.

9. The method according to claim 8, wherein the data is determined to be integral during wireless communication when the first hash value, the hash value to be compared, and the second hash value are all equal.

10. The method according to claim 1, wherein the encrypted data comprises a first expiration date of the symmetric key, the method further comprising:
    receiving a negotiation message from the second wireless port connection device, the negotiation message comprising a second expiration date of the symmetric key; and
    updating the first expiration date to the second expiration date using the second expiration date.

11. A first wireless port connection device for wireless communication with a second wireless port connection device, the first wireless port connection device comprising:
    at least one processor; and
    a memory coupled to the at least one processor and having instructions stored thereon, wherein the instructions, when executed by the at least one processor, cause the first wireless port connection device to perform actions comprising:
    sending a first public key of the first wireless port connection device to an authentication server;
    receiving a signed first certificate from the authentication server, the first certificate comprising a server public key of the authentication server;
    receiving a signed second certificate from the second wireless port connection device;
    acquiring a second public key of the second wireless port connection device in the second certificate using the server public key;
    generating a symmetric key using the second public key;
    encrypting data using the symmetric key; and
    sending the encrypted data to the second wireless port connection device.

12. The first wireless port connection device according to claim 11, wherein the instructions, when executed by the at least one processor, further cause the first wireless port connection device to perform the action of:
    sending the first certificate to the second wireless port connection device for use in receiving the second certificate.

13. The first wireless port connection device according to claim 11, wherein acquiring a second public key of the second wireless port connection device in the second certificate using the server public key comprises:
    decrypting the second certificate using the server public key to acquire the second public key in the second certificate.

14. The first wireless port connection device according to claim 11, wherein generating a symmetric key using the second public key comprises:
    acquiring a first random number, the first random number being used to generate a first security message;
    receiving a second security message generated by the second wireless port connection device using a second random number;
    decrypting the second security message using the second public key to acquire the second random number; and
    generating the symmetric key based on the first random number and the second random number.

15. The first wireless port connection device according to claim 14, wherein generating a first security message comprises:
    generating the first security message by encrypting the first random number using a first private key of the first wireless port connection device.

16. The first wireless port connection device according to claim 11, wherein encrypting data using the symmetric key comprises:
    acquiring a first hash value by performing a hash operation on the data; and
    acquiring an encrypted transmission message by encrypting the data and the first hash value using the symmetric key, wherein the first hash value is used to determine the integrity of the data during wireless communication.

17. The first wireless port connection device according to claim 16, wherein the encrypted transmission message is received by the second wireless port connection device and is decrypted by the second wireless port connection device using the symmetric key to acquire a decrypted message, wherein the decrypted message comprises a hash value to be compared.

18. The first wireless port connection device according to claim 17, wherein the decrypted message is used by the second wireless port connection device to acquire a second hash value, and a comparison of the second hash value with the hash value to be compared is used to determine the integrity of the data during wireless communication.

19. The first wireless port connection device according to claim 18, wherein the data is determined to be integral during wireless communication when the first hash value, the hash value to be compared, and the second hash value are all equal.

20. A computer program product tangibly stored on a non-transitory computer-readable medium and including machine-executable instructions, wherein the machine-executable instructions, when executed by a machine, cause the machine to perform the following steps:
    sending a first public key of a first wireless port connection device to an authentication server;
    receiving a signed first certificate from the authentication server, the first certificate comprising a server public key of the authentication server;
    receiving a signed second certificate from a second wireless port connection device;
    acquiring a second public key of the second wireless port connection device in the second certificate using the server public key;
    generating a symmetric key using the second public key;
    encrypting data using the symmetric key; and
    sending the encrypted data to the second wireless port connection device.

* * * * *